(12) United States Patent
Kuniba

(10) Patent No.: US 7,733,390 B2
(45) Date of Patent: Jun. 8, 2010

(54) IMAGE-PROCESSING DEVICES, METHODS, AND PROGRAMS, AND ELECTRONIC CAMERAS AND THE LIKE COMPRISING SAME

(75) Inventor: Hideyasu Kuniba, Tokyo (JP)

(73) Assignee: Nikon Corporation, Tokyo (JP)

(*) Notice: Subject to any disclaimer, the term of this patent is extended or adjusted under 35 U.S.C. 154(b) by 729 days.

(21) Appl. No.: 11/639,916

(22) Filed: Dec. 15, 2006

(65) Prior Publication Data

US 2007/0097228 A1 May 3, 2007

Related U.S. Application Data

(63) Continuation of application No. PCT/JP2005/011034, filed on Jun. 16, 2005.

(30) Foreign Application Priority Data

Jun. 18, 2004 (JP) .............................. 2004-180579

(51) Int. Cl.
H04N 5/217 (2006.01)
(52) U.S. Cl. ...................................... 348/241
(58) Field of Classification Search .............. 348/222.1, 348/241, 234, 254, 251, 557, 631, 362; 382/167, 382/168, 169, 254–275
See application file for complete search history.

(56) References Cited

U.S. PATENT DOCUMENTS 5,991,456 A 11/1999 Rahman et al.
6,023,533 A * 2/2000 Sano et al. ................... 382/274
6,791,609 B2 * 9/2004 Yamauchi et al. ............ 348/273
7,359,573 B2 * 4/2008 Park et al. .................... 382/274
2005/0141002 A1 * 6/2005 Takano et al. ................ 358/1.9

FOREIGN PATENT DOCUMENTS

| JP | 05-076036 A | 3/1993 |
|---|---|---|
| JP | 09-247483 A | 9/1997 |
| JP | 2002-290707 A | 10/2002 |
| JP | 2003-126057 A | 5/2003 |
| JP | 2003-348335 A | 12/2003 |
| JP | 2004-140692 A | 5/2004 |

OTHER PUBLICATIONS

International Search Report for PCT/JP2005/011034, 2 pages, dated Oct. 4, 2005.

* cited by examiner

*Primary Examiner*—David L Ometz
*Assistant Examiner*—Akshay Trehan
(74) *Attorney, Agent, or Firm*—Klarquist Sparkman, LLP

(57) ABSTRACT

Image-processing devices and methods are disclosed. Such a device includes an image-input unit, a fluctuation-extraction unit, a modulation-signal-generation unit, a level-compression unit, and a gradation-correction unit. The image-input unit inputs an image. The fluctuation-extraction unit extracts a local-fluctuation component from the input image and generates a local-fluctuation image containing a fluctuation component. The modulation-signal-generation unit produces a modulation signal used for modulating the input image to a local-fluctuation image. The level-compression unit level-compresses the modulation signal. The gradation-correction unit modulates the input image according to the modulation signal after level-compression, thereby producing a gradation-corrected image.

18 Claims, 5 Drawing Sheets

IMAGE-PROCESSING DEVICES, METHODS, AND PROGRAMS, AND ELECTRONIC CAMERAS AND THE LIKE COMPRISING SAME

CROSS REFERENCE TO RELATED APPLICATION

This application is a continuation application of International Application No. PCT/JP 2005/011034, filed on Jun. 16, 2005, designating the U.S., and claiming the benefit of priority from Japan Patent Application No. 2004-180579, filed on Jun. 18, 2004, the entire contents of which are incorporated herein by reference.

TECHNICAL FIELD

This disclosure relates to image-processing devices, image-processing programs, electronic cameras, and image-processing methods for correcting the gradation of an input image.

BACKGROUND ART

Conventionally, it has been very difficult to correct the gradation of an image having extremely bright and dark portions. In other words, gradation-correction based on the bright portion causes the dark portion to blacken, making only the dark portions conspicuous and placing the entire image in poor gradation. On the contrary, gradation-correction based on the dark portion causes the color of the bright portion to be too white and the gradation to disappear. As a result, the bright portion will lack gradation and the entire image will be in poor gradation.

To reduce such a difference in brightness, a conventional gradation-conversion-processing method uses a low-contrast curve. It is difficult, however, to drastically reduce an extremely large difference in brightness in an image. Moreover, attempts to perform such a reduction tend to decrease differences in brightness in the middle gradation area of the image.

Another conventional processing method makes uniform a distribution-of-graduation histogram of an image in order to correct the image with a biased gradation. In this processing method, it is possible to increase the difference in brightness in the dense area of the gradation histogram. However, in the sparse area of the gradation histogram the difference in brightness is reduced, which may result in the gradation collapse becoming conspicuous at some portions of the image.

In the technique disclosed in U.S. Pat. No. 5,991,456, it is possible to increase the brightness of a shadow area of an image and to enhance a small gradational change in the shadow area. As a result, it is possible to brighten a gradational change, which would otherwise be hidden in the shadow area of the image. But, due to the brightened shadow area, color balance of the shadow area may appear unnatural, and blue components of the shaded portion may be enhanced, for example. Further, a too-brightened shadow area can impair the shades of the entire image, giving the image a somber impression.

SUMMARY OF THE INVENTION

In view of solving the above problems, one object of the present invention is to provide methods for enhancing a local change in gradation that otherwise would be hidden visually, while suppressing a change in brightness of the entire image.

Another object is to provide methods for correcting unnatural color balance in an image due to the change in brightness of the entire image.

An image-processing device of the present invention includes an image-input unit, a fluctuation-extraction unit, a modulation-signal-generation unit, a level-compression unit, and a gradation-correction unit. The image-input unit inputs an image. The fluctuation-extraction unit extracts a local-fluctuation component from the input image and generates a local-fluctuation image containing the local-fluctuation component. The modulation-signal-generation unit generates a modulation signal for modulating the input image to the local-fluctuation image. The level-compression unit level-compresses the modulation signal. The gradation-correction unit modulates the input image with the level-compressed modulation signal to produce a gradation-corrected image.

The input image can be a color image comprising a plurality of components, and the gradation-correction unit generates a multiplied image and an offset-corrected image. The multiplied image is generated by multiplying a level-compressed gain map and the plurality of components. The offset-corrected image is generated by subjecting the plurality of components of the input image to offset-correction by aligning with the multiplied image in signal level. In this case, the gradation-correction unit produces a gradation-corrected image by performing a weighted addition of the multiplied image and the offset-corrected image. The gradation-correction unit can change a weighted ratio of the multiplied image and the offset-corrected image in accordance with the modulation signal.

Also, the gradation-correction unit can include an adjustment-input unit and an effect-adjustment unit. The adjustment-input unit accepts, from a user, adjustment of a weighted ratio Ws for a shadow area and a weighted ratio Wh for a highlight area. The effect-adjustment unit performs weighted addition of the gradation-corrected image and the input image using the weighted ratio Wh in an area in which the modulation signal is no greater than a predetermined threshold value. The effect-adjustment unit performs weighted addition of the gradation-corrected image and the input image using the weighted ratio Ws in an area in which the modulation signal has a threshold value exceeding the predetermined threshold value.

The modulation-signal-generation unit can include a range-adjustment unit and a signal-calculation unit. The range-adjustment unit adjusts a signal range of the local-fluctuation image to a predetermined range. The signal-calculation unit calculates a modulation signal for modulating the input image to the range-adjusted local-fluctuation image.

The fluctuation-extraction unit can further generate a local-fluctuation image of the reduced image which is obtained by reducing the number of pixels of the input image. The range-adjustment unit can also acquire a signal range of the local-fluctuation image of the reduced image and determine a range-adjustment parameter for adjusting the signal range to the predetermined range. In this case, the range-adjustment unit adjusts the signal range of the local-fluctuation image of the input image using the determined range-adjustment parameter. Desirably, the reduced image is subjected, for preview display, to the same gradation-correction as applied to the input image.

The fluctuation-extraction unit generates the local-fluctuation image containing the fluctuation component by extracting the local-fluctuation component from the luminance component of the input image. The luminance component desirably is a V component in the HSV color system.

An image-processing program of the present invention causes a computer to function as the image-input unit, the fluctuation-extraction unit, the modulation-signal-generation unit, the level-compression unit, and the gradation-correction unit as summarized above.

An electronic camera of the present invention includes an image-processing device, as summarized above, and an image-pickup device. The image-pickup device images an object to generate an input image to be supplied to the image-processing device.

One embodiment of an image-processing method of the present invention comprises steps as summarized below:

(1) Image-input step of acquiring an input image;

(2) Fluctuation-extraction step of extracting a local-fluctuation component from the input image to generate a local-fluctuation image containing the fluctuation component;

(3) Modulation-signal-generation step of acquiring a modulation signal for modulating the input image to the local-fluctuation image;

(4) Level-compression step of level-compressing the modulation signal; and (5) Gradation-correction step of modulating the input image with the level-compressed modulation signal to obtain a gradation-corrected image.

Desirably, at least one of the image-processing device configurations summarized above is used for performing the image-processing method.

A local-fluctuation image can be generated by extracting a local-fluctuation component from the input image. The local-fluctuation image typically contains a relatively small direct-current fluctuation (that is, a difference in brightness in a large area) and a relatively large local-gradation fluctuation.

A modulation signal for modulating the input image to the local-fluctuation image is subsequently obtained or produced. In general, the local-fluctuation image includes a small difference in brightness level in a large area and a conspicuous shadow area. Consequently, the larger the shadow area, the higher the level of the modulation signal therein.

Next, the modulation signal is level-compressed to limit an excessive modulation signal in the large shadow area.

Subsequently, a gradation-corrected image is generated from a multiplication result of the level-compressed modulation signal and the input image. In this case, the multiplication of the level-compressed modulation signal results in suppressing excessive brightness unique to the shadow area.

Thus, it is possible to enhance the gradational change in an image which would otherwise tend to be hidden visually, while suppressing unnatural brightness in large shadow areas.

BRIEF DESCRIPTION OF THE DRAWINGS

The nature, principles, and utility of the invention will become more apparent from the following detailed description when read in conjunction with the accompanying drawings in which like parts are designated by identical reference numbers, in which.

DETAILED DESCRIPTION

First Embodiment

Figure 1:
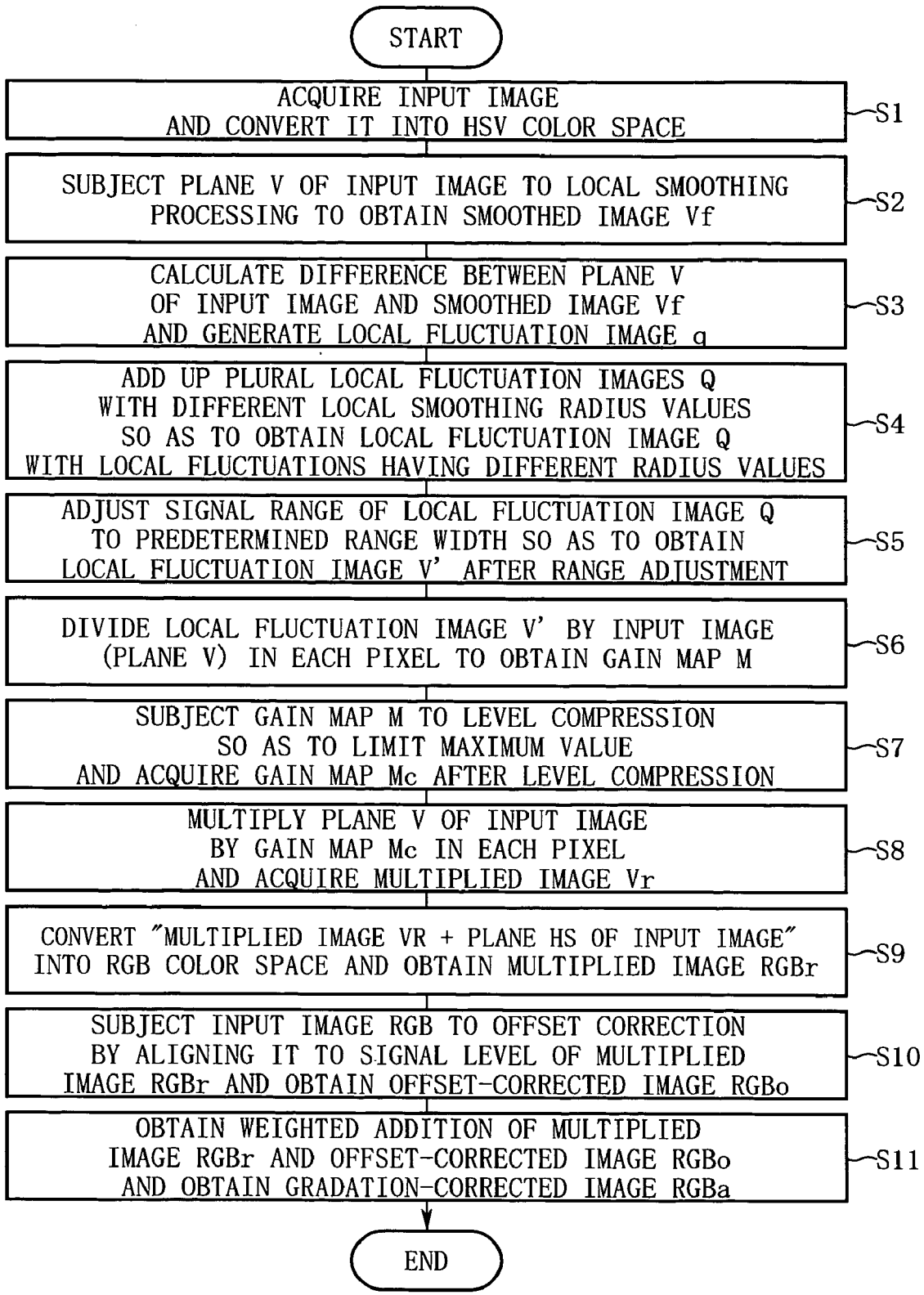
FIG. 1 is a diagram for explaining the operation of an image-processing program in a first embodiment.

FIG. 1 is a diagram for explaining image processing according to the first embodiment. The image-processing as performed by a computer will be described in the order of the step numbers shown in FIG. 1.

Step S1: The computer receives or otherwise obtains an input image RGB (the number of horizontal pixels is W, the number of vertical pixels is P) in RGB color space and converts it into an image in HSV color space.

Step S2: The computer subjects a V plane, indicating the luminance (brightness) component of each pixel of the input image, to local-smoothing processing and produces a smoothed image Vf. For example, after setting a radius r of local smoothing, the computer first performs local smoothing in the horizontal direction of the frame using initial values and recurrence formulas as follows.

Initial values:

$$S(0,y) = rV(0,y) + V(0,y) + \ldots + V(r,y) \quad [1]$$

$$Vz(0,y) = S(0,y)/(2r+1) \quad [2]$$

Recurrence Formulas:

$$S(x,y) = S(x-1,y) - V(x-1-r,y) + V(x+r,y) \quad [3]$$

$$Vz(x,y) = S(x,y)/(2r+1) \quad [4]$$

However, when $x-1-r<0$, it is assumed that $V(x-1-r, y) = V(0, y)$, and when $x+r \geq W$, it is assumed that $V(x+r, y) = V(W-1, y)$ Subsequently, the computer performs local smoothing in the vertical direction of the frame using initial values and recurrence formulas as follows.

Initial Values:

$$S(x,0) = rVz(x,0) + Vz(x,0) + V(x,1) + \ldots + Vz(x,r) \quad [5]$$

$$Vf(x,0) = S(x,0)/(2r+1) \quad [6]$$

Recurrence Formulas:

$$S(x,y) = S(x-1,y) - Vz(x,y-1-r) + Vz(x,y+r) \quad [7]$$

$$Vf(x,y) = S(x,y)/(2r+1) \quad [8]$$

However, when $y-1-r<0$, it is assumed that $Vz(x, y-1-r) = Vz(x, 0)$, and when $y+r \geq P$, it is assumed that $Vz(x, y+r) = Vz(x, P-1)$.

Step S3: Here, the computer produces three kinds of smoothed images $Vf_{0.1}$, $Vf_{0.05}$, and $Vf_{0.025}$ by varying the radius r of local smoothing as $r = 0.1W$, $0.05W$, and $0.025W$.

Next, the computer calculates the respective differences between the input image (V plane) and the three kinds of smoothed images, based on the following formulas, to produce local-fluctuation images $Q_{0.1}$, $Q_{0.05}$, and $Q_{0.025}$:

$$Q_{0.1}(x,y) = \log(V(x,y)+\delta) - \log(Vf_{0.1}(x,y)+\delta)$$

$$Q_{0.05}(x,y) = \log(V(x,y)+\delta) - \log(Vf_{0.05}(x,y)+\delta)$$

$$Q_{0.025}(x,y) = \log(V(x,y)+\delta) - \log(Vf_{0.025}(x,y)+\delta) \quad [9]$$

where δ in the above formulas is a constant to prevent the divergence of logarithmic operation. The constant δ is assumed to have a value as small as negligible.

It is desirable to omit the level-compression by logarithmic operation or to adjust the magnitude of level-compression in accordance with the conditions such as the γ correction to which the input image is subjected in advance.

Step S4: Subsequently, the computer generates a local-fluctuation image Q with local fluctuations having different radius values r in a mixed manner, by adding the local-fluctuation images $Q_{0.1}$, $Q_{0.05}$, and $Q_{0.025}$:

$$Q(x,y)=[Q_{0.1}(x,y)+Q_{0.05}(x,y)+Q_{0.025}(x,y)]/3 \quad [10]$$

In this averaging operation, it is desirable to perform weighted-addition with weighting factors, having taken into consideration the difference in visual sensitivity for each radius.

Step S5: Next, the computer determines the maximum value $Q_{max}$ and the minimum value $Q_{min}$ of the local-fluctuation image Q and divides its range $[Q_{max}, Q_{min}]$ into 4,096 increments to define the divided increments. The computer produces a cumulative histogram c(q) by sequentially cumulating the frequency of the divided increments, starting from the minimum-value $Q_{min}$ side.

Then, the computer determines a value of q that satisfies c(q)=0.001×W×P and sets it as a lower range limit th1 of the local-fluctuation image Q. The computer also determines a value of q that satisfies c(q)=0.99×W×P and sets it as an upper range limit th2 of the local-fluctuation image Q.

Next, the computer adjusts the signal range [th1, th2] of the local-fluctuation image Q to a predetermined signal range $[V_{max}, V_{min}]$:

$$V'(x,y)=[Q(x,y)-th1](V_{max}-V_{min})/(th2-th1)+V_{min} \quad [11]$$

where the upper limit and the lower limit of a local-fluctuation image V' are trimmed so that $V_{min} \leq V'(x, y) \leq V_{max}$.

Step S6: The computer generates a gain map M by dividing the local-fluctuation image V' after the range adjustment by the input image (V plane) in each pixel, using the following formula:

$$M(x,y)=V'(x,y)/V(x,y) \quad [12]$$

Here, it is assumed that M(x, y)=1.0 at the portion where V(x, y)=0.

Step S7: The computer generates a gain map Mc whose maximum value has been limited by subjecting the gain map M to level-compression by using, for example, the following formula:

$$Mc(x,y)=M_{max} \cdot M(x,y)/[M_{max}+M(x,y)] \quad [13]$$

Here, $M_{max}$ is the maximum value after the level-compression and is set, for example, as $M_{max}=12$. Other than the formula [13], the maximum value may be limited by a so-called soft limiter formula.

Step S8: The computer produces a multiplied image Vr by multiplying the V plane of the input image by the gain map Mc in each pixel, using the following expression:

$$Vr(x,y)=Mc(x,y) \cdot V(x,y) \quad [14]$$

However, the upper limit and the lower limit of the multiplied image Vr are clipped so that $V_{min} \leq Vr(x, y) \leq V_{max}$.

Step S9: The computer converts an image HSVr composed of the multiplied image Vr and the HS plane of the input image into the RGB color space to produce a multiplied image RGBr.

Step S10: The computer subjects each RGB component to offset on a pixel basis while keeping the color differences in the input image RGB so as to align with the multiplied image RGBr, thereby producing an offset-corrected image RGBo.

Step S11: The computer produces a gradation-corrected image RGBa by performing weighted addition of the multiplied image RGBr and the offset-corrected image RGBo. Here, it is desirable to refer to the gain of the gain map Mc and to increase/decrease the weighted ratio of the multiplied image RGBr in accordance with the gain in the weighted addition.

As a result of the above steps, it is possible to produce a gradation-corrected image RGBr with enhanced local fluctuation in the image.

The first embodiment can produce the effects enumerated below:

(1) First the local-fluctuation image V' is produced. The local-fluctuation image V' has a small difference in brightness in a large area and is bright and prominent in the shadow area. In addition, the local-fluctuation image V' also includes suppressed brightness in the highlight area, and the contents thereof are easily recognizable.

Next, the gain map M is generated by dividing the normalized signal range of the local-fluctuation image V' by the input image. The gain map M reflects the standing-out of the dark portion of the local-fluctuation image V' and indicates a comparatively large gain in the large shadow area. On the other hand, the gain map M reflects the suppression of the bright portion of the local-fluctuation image V', indicating a comparatively small gain in the highlight area.

Next, the gain map Mc is generated by level-compressing the gain map M. With this gain map Mc, an excessive gain in the large shadow area is suppressed adequately by the level-compression.

Next, the multiplied image Vr is obtained by multiplying the gain map Mc (after the level-compression) and the input image. The multiplied image Vr will be an image with enhanced local gradation fluctuations and suppressed brightness in the large shadow areas. This can accordingly eliminate the problems of the prior art in which large shadow areas become excessively bright, causing the change in shades to be less effective and smoothed excessively.

In the multiplied image Vr, the color balance in the shadow area can also be prevented from collapsing by suppressing the standing-out of the shadow areas. This results in solving the problem of the prior art in which the color balance in the shadow areas tends to collapse.

(2) The multiplied image RGBr is obtained by converting the multiplied image Vr into the RGB color space. Next, the offset-corrected image RGBo is obtained, by subjecting the RGB component of the input image to offset-correction on a pixel basis, to align with the multiplied image RGBr in the signal level. In the offset-corrected image RGBo, the signal level is substantially the same as that in the multiplied image RGBr. However, the collapse in color balance is extremely unlikely to occur because the color difference among RGB is equal to that of the input image.

In the first embodiment, the gradation-corrected image RGBa is generated by performing weighted addition of the multiplied image RGBr and the offset-corrected image RGBo. As a result, in the gradation-corrected image RGBa, the change in color balance in the shadow area is suppressed, and the problem of the prior art in which the color balance in the shadow area collapses can be solved without fail.

(3) It is also possible to increase/decrease flexibly the weighted ratio in accordance with the gain map when weight-adding the multiplied image RGBr and the offset-corrected image RGBo. In this case, it is desirable to reduce the weighted ratio of the multiplied image RGBr in the image area indicating a gain that is visually sensitive to the change in color (for example, an image area indicating a middle gain on the gain map). Due to the increase/decrease of the ratio, it is possible to prevent the collapse of color balance more securely.

(4) The gradation-correction is performed by producing the local-fluctuation image, the gain map, etc., with respect to the V component in the HSV color system. By subjecting the luminance component, such as the V component, to gradation-correction, the influence of color noise, etc., is eliminated, and gradation-correction is realized with only a small increase in noise. Further, since the gradational change in the luminance component has high visual sensitivity, it is now possible to generate an image in which gradations are abundant particularly in the feeling of gradation.

Whenever this gradation-correction is performed in a range of values the V component can assume, deviation from the color area after performing gradation-correction is avoided. In other words, it is possible to omit troublesome processing of map-transforming a signal outside the color area into a signal within the color area.

Second Embodiment

Figure 2:
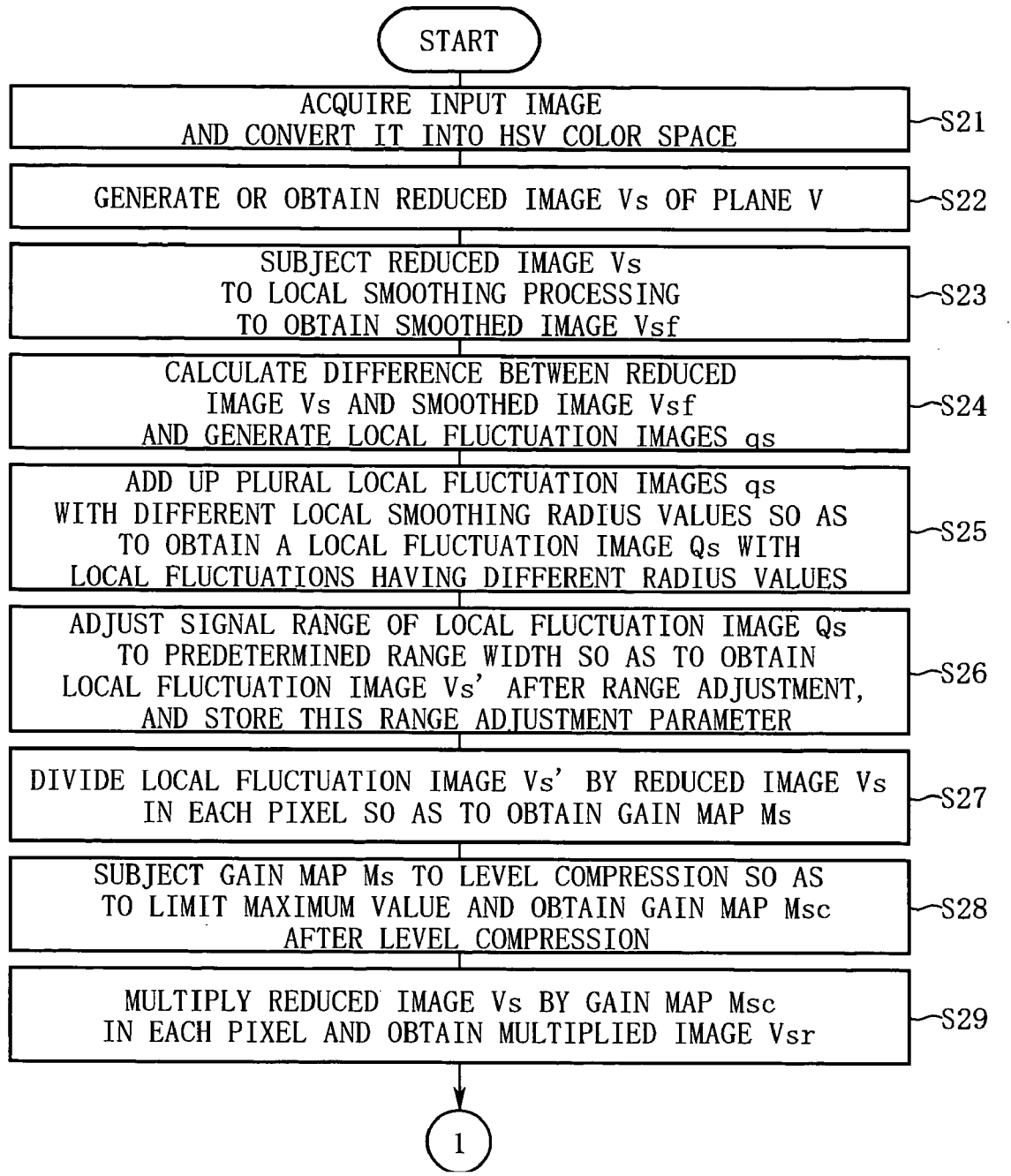
FIG. 2 is a diagram for explaining the operation of an image-processing program in a second embodiment.
Figure 3:
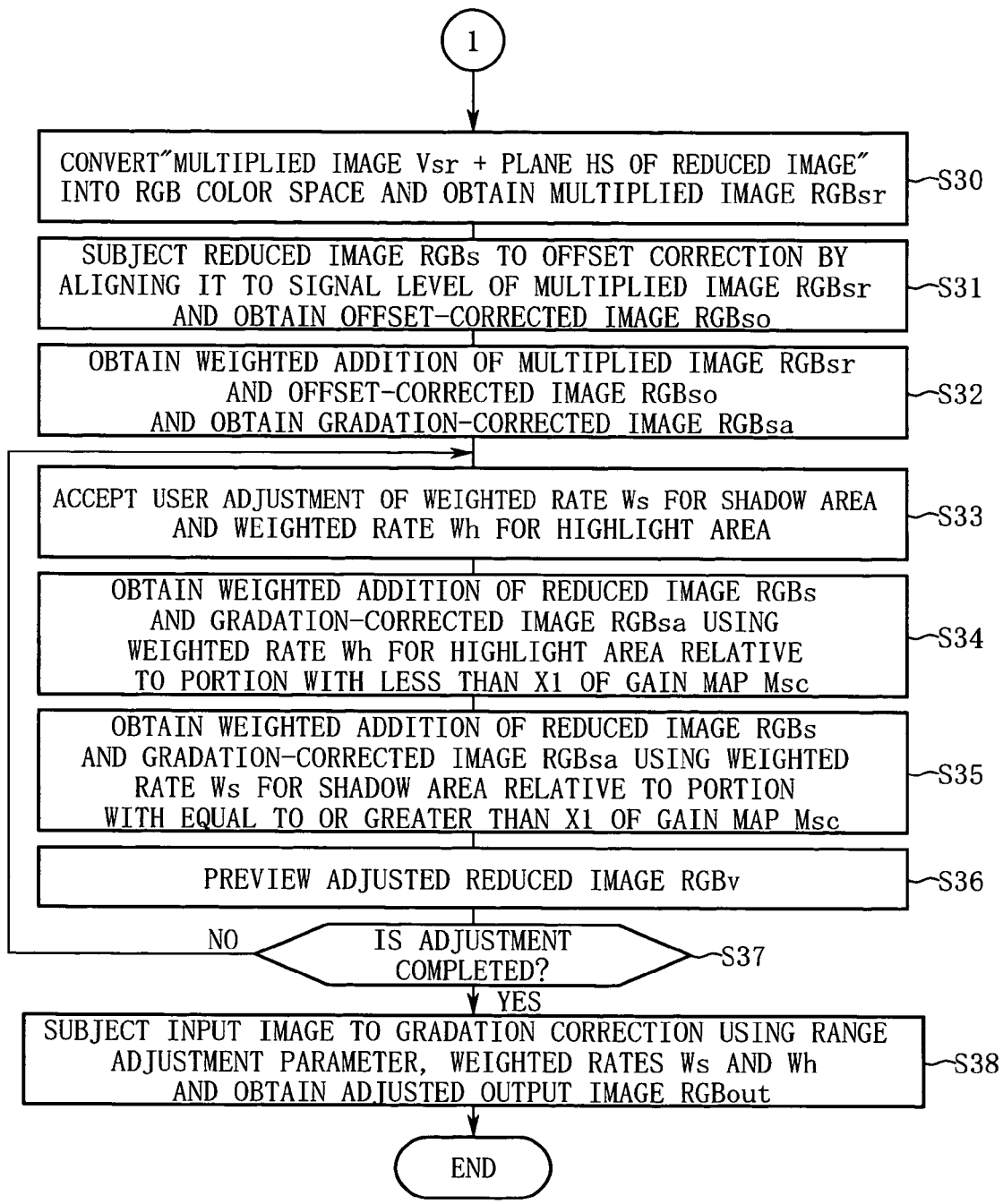
FIG. 3 is a diagram for further explaining the operation of the image-processing program in the second embodiment.

FIG. 2 and FIG. 3 are diagrams for explaining the operation of an image-processing program according to this embodiment. The image-processing operation as performed by a computer will be described below in the order of the step numbers shown in these figures.

Step S21: The computer inputs an image RGB (the number of horizontal pixels is W, the number of vertical pixels is P) in the RGB color space and converts it into the HSV color space.

Step S22: The computer performs a resolution-conversion with respect to the V plane of the input image and generates a reduced image Vs in which the number of longitudinal and transverse pixels is reduced. When the reduced image is recorded in advance in the file of the input image, it is possible to obtain the reduced image Vs by converting the reduced image in the file into the HSV color space.

Steps S23 to S32: The computer obtains a gain map Msc after the level-compression and obtains a gradation-corrected image RGBsa by subjecting the reduced image Vs to a series of gradation-corrections. Here, the gradation-correction is the same procedure as that in steps S2 to S11 in the first embodiment (FIG. 1), and therefore the description is omitted. Note that the computer stores the range-adjustment parameters (th1, th2) obtained in step S26 and uses them when performing the gradation-correction of the input image.

Step S33: The computer accepts the adjustment of the weighted ratio Ws for the shadow area and the weighted ratio Wh for the highlight area by the operation that is input from a user.

Step S34: The computer performs weighted addition of the reduced image RGBs and the gradation-corrected image RGBsa in the RGB color space using the weighted ratio Wh for the highlight area for the portion less than the threshold value of the gain map Msc. Note that this threshold value is one for discriminating a large highlight area from the gain map and is set to, for example, "×1".

Step S35: The computer performs weighted addition of the reduced image RGBs and of the gradation-corrected image RGBsa in the RGB color space using the weighted ratio Ws for the shadow area for the portion equal to or greater than the threshold value of the gain map Msc. Note that this threshold value is one for discriminating a large shadow area from the gain map and is set to, for example, "×1".

Step S36: The effect-adjusted reduced image RGBv can be obtained by the weighted addition in steps S34 and S35. The computer displays the reduced image RGBv on a monitor screen for preview.

Step S37: The user can further adjust the weighted radios Ws and Wh while watching the preview display. When accepting the adjustment operation, the computer returns the operation to step S33.

As a result of the above operation, the user's adjustment of the weighted ratios Ws and Wh is reflected immediately in the preview display. The user finally determines desired weighted ratios Ws and Wh while checking the result shown in the preview display. After the final determination, the user inputs to the computer an instruction to complete the adjustment. Upon receipt of the instruction to complete the adjustment, the computer advances the operation to step S38.

Step S38: The computer subjects the input image to gradation-correction using the range-adjustment parameter stored in step S26 and the finally determined weighted ratios Ws and Wh and obtains the effect-adjusted output image RGBout. Here, the gradation-correction to which the input image is subjected is the same gradation-correction as that in the above-mentioned steps S23 to S35, and therefore the description is omitted.

As a result of the operations described above, in the second embodiment the same effects as realized in the first embodiment are obtained.

In the second embodiment an image is roughly divided into the shadow area and the highlight area according to the gain of the gain map. Both areas are weight-added independently of each other according to the weighted ratios Ws and Wh. Consequently, it is possible to vary the enhancement effect of the local fluctuation in gradation independently in the shadow area and the highlight area.

Since the range-adjustment parameter obtained for the reduced image, is used for the gradation-correction of the input image, it is not necessary to newly determine the range-adjustment parameter of the input image with many pixels. Hence, the gradation-correction of the input image can be increased in speed.

Third Embodiment

A third embodiment is characterized by saturation-adjustment for reflecting a gain map in an image, etc. The operations in the third embodiment are described below.

First, the computer performs the operations in steps S1 to S6 in the first embodiment and thereby obtains a gain map M. The computer level-compresses the gain map M using the following formula:

$$Mc(x,y)=M_{max} \cdot (x,y)/[M_{max}^2+M(x,y)^2]^{1/2} \quad [13']$$

wherein $M_{max}$ is the maximum value after the level-compression. It is desirable to set $M_{max}$ to about six so as not to collapse the color balance when the gain map is reflected in the image.

Next, the computer obtains the multiplied RGBr by reflecting the gain map Mc after the level-compression in the input image RGB in accordance with the following formulas:

$$Rr(x,y)=R(x,y)+V(x,y)[Mc(x,y)-1][R(x,y)/V(x,y)]^{Psat}$$

$$Gr(x,y)=G(x,y)+V(x,y)[Mc(x,y)-1][G(x,y)/V(x,y)]^{Psat}$$

$$Br(x,y)=B(x,y)+V(x,y)[Mc(x,y)-1][B(x,y)/V(x,y)]^{Psat} \quad [14']$$

wherein Psat is a saturation-adjustment parameter and is set to, for example, about 0.5. It is possible to obtain the multiplied image RGBr that has enhanced the fluctuation of saturation by increasing the Psat and causing it to approach one. Alternatively, it is possible to obtain the multiplied image RGBr that has suppressed the fluctuation of saturation by causing the Psat to approach zero.

In the formulas [14'], the conversion-processing from the HSV color space into the RGB color space is omitted by directly reflecting the gain map Mc in the image in the RGB color space.

Next, the computer distributes, on a pixel basis, a shadow parameter Ps ($0 \leq Ps \leq 100$) and a highlight parameter Ph ($0 \leq Ph \leq 100$), that are set for a user based on the gain map M, and determines a weighted ratio $\omega(x, y)$:

when $M(x,y) \leq 1.0, \omega(x,y) = Ps/100$ when $M(x,y) < 1.0, \omega(x,y) = Ph/100$     [15]

The computer obtains the effect-adjusted output image RGBout by performing weighted addition of the multiplied image RGBr and the input image RGB according to the weighted ratio $\omega(x, y)$:

$RGB_{out}(x,y) = \omega RGBr(x,y) + (1-\omega) RGB(x,y)$     [16]

Desirably, the computer stores the multiplied image RGBr and the input image RGB in a working area or the like. In this case, it is possible immediately to repeat the weighted conversion whenever the parameters Ps and Ph are adjusted and changed by the user.

Fourth Embodiment

Figure 4:
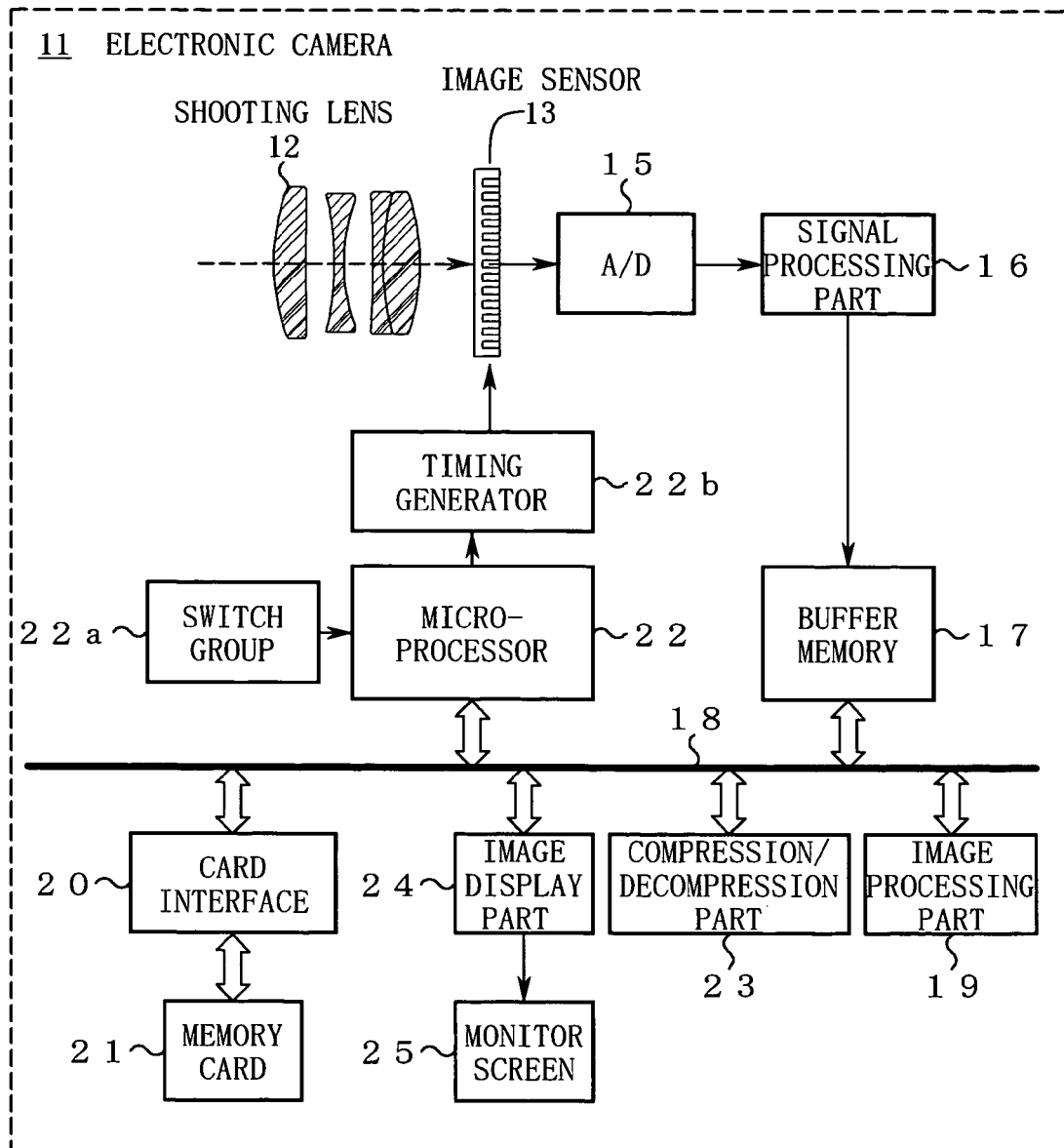
FIG. 4 is a block diagram showing a configuration of the fourth embodiment.

A fourth embodiment is directed to an electronic camera. FIG. 4 is a block diagram showing an example configuration of the embodiment. In FIG. 4, to an electronic camera 11, a shooting lens 12 is mounted. In the image space of the shooting lens 12, a light-receiving surface of an image sensor 13 is arranged. The operation of the image sensor 13 is controlled by an output pulse of a timing generator 22b.

An image generated by the image sensor 13 is stored temporarily in a buffer memory 17 via an analog-to-digital converter 15 and a signal-processor 16. The buffer memory 17 is connected to a bus 18. To the bus 18, an image-processor 19, a card-interface 20, a microprocessor 22, a compression/decompression portion 23, and an image-display portion 24 are connected. Among these, the card-interface 20 reads and writes data from/to a detachable memory card 21. To the microprocessor 22 a signal of the user's operation is input from a switch group 22a of the electronic camera 11. The image-display portion 24 displays an image on a monitor screen 25 provided on the backside of the electronic camera 11.

The electronic camera 11 of this embodiment performs gradation-correction according to any of the first to third embodiments (FIG. 1 to FIG. 3) using the microprocessor 22 and the image-processing portion 19. Such gradation-correction may be performed to image data that are obtained during shooting or to image data recorded in the memory card 21 after shooting.

The embodiments are described above in the context of a case in which a user performs gradation-correction using a computer or an electronic camera. However, the present invention is not limited thereto. For example, the image-processing methods shown in FIG. 1 to FIG. 3 may be applied to image data transmitted from a user via an image-processing server on the Internet.

The embodiments are also described in the context of a case in which gradation-correction is performed in the HSV color space. However, the present invention is not limited thereto. For example, it is possible to perform the same gradation-correction in the Lab color space or other color spaces. It is desirable to limit the signal level of each signal component so as to fall within a color range determined after the gradation-correction.

The embodiments are also described in the context of a case in which gradation-correction is performed to an entire image. However, the present invention is not limited thereto. For example, it is possible to perform gradation-correction only to a part of the image (e.g., a main object, a shade portion, a trimming range, a background portion except for person and skin color area, etc.) It is desirable to determine the range-adjustment parameter based on the signal range of the local-fluctuation image of the entire image. As a result of this operation, it is possible to align the gradation-correction to the portion of the image with the gradation-fluctuation in the entire image. This can alleviate a problem in which the gradation-correction is conspicuous unnaturally in a portion of the image. It is also desirable to produce the local-fluctuation image from the reduced image (entire image) and determine the range-adjustment parameter based on the signal range of the local-fluctuation image. As a result of this operation, since the range-adjustment parameter is obtained from the reduced image with a small number of pixels, the processing cost is reduced, and the processing time required to perform gradation-correction can be further shortened.

In the foregoing embodiments, the gain map is created by obtaining the modulation signal ("gain" in the embodiments) in each pixel. However, the modulation signal is not limited to the gain map. For example, it is possible to obtain the modulation signal in a pixel-block unit, comprising a plurality of pixels. In such a case, it is possible to correct the change in gradation of the middle- and low-area components of the spatial frequency by removing high-spatial-frequency components from the modulation signal. Thus, it is possible to correct the change in gradation of the visually conspicuous middle and low areas while suppressing an increase in the noise component having a high spatial frequency.

Fifth Embodiment

Figure 5:
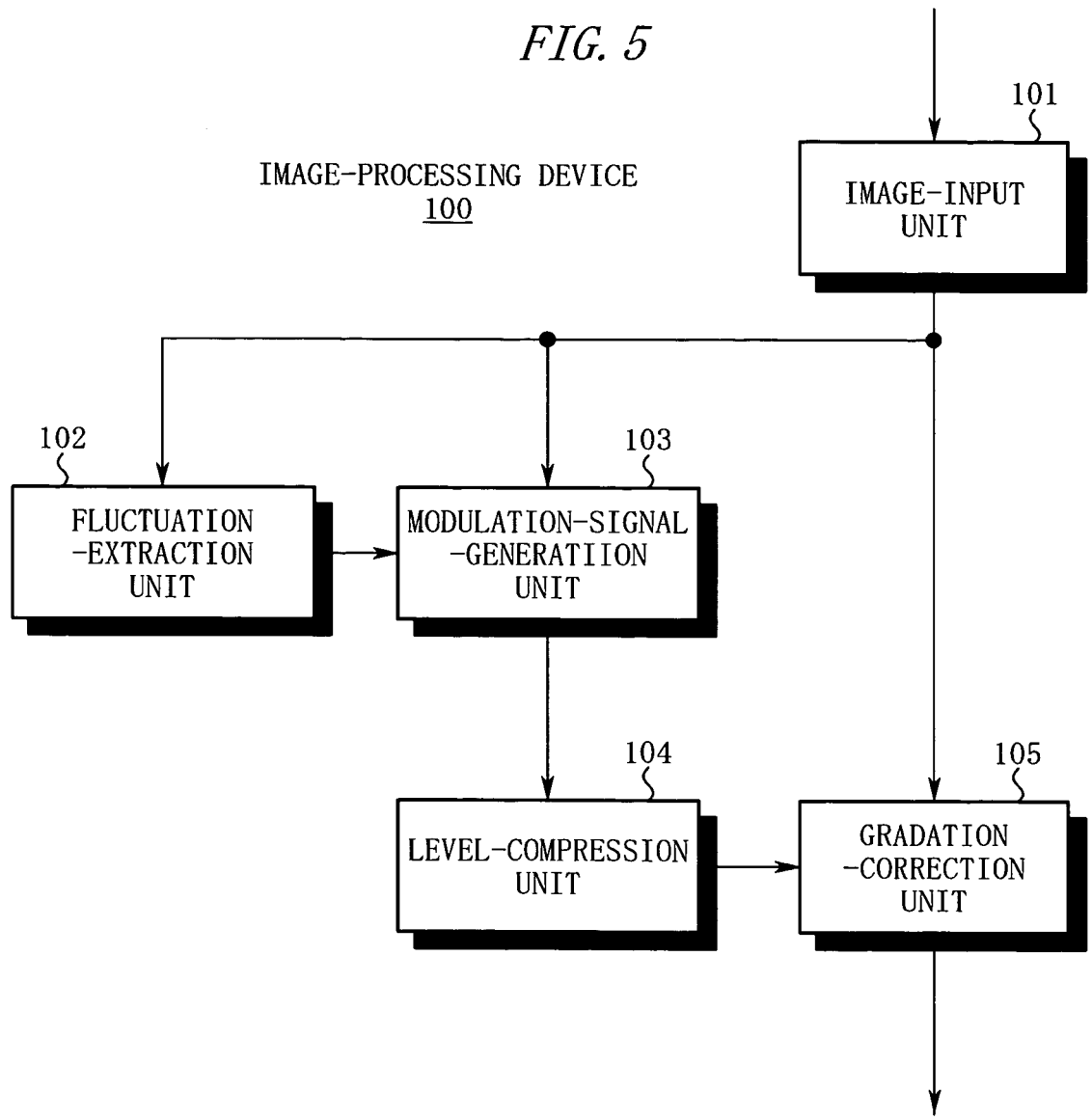
FIG. 5 is a block diagram showing a configuration of an image-processing unit 100.

FIG. 5 is a block diagram showing a configuration of image-processing device 100. An image-processing device 100 of the present invention includes an image-input unit 101, a fluctuation-extraction unit 102, a modulation-signal-generation unit 103, a level-compression unit 104, and a gradation-correction unit 105 as described below.

The image-input unit 101 acquires an input image. The fluctuation-extraction unit 102 extracts a local fluctuation component from the input image and generates a local-fluctuation image containing the fluctuation component. The modulation-signal-generation unit 103 acquires a modulation signal for modulating the input image to the local-fluctuation image. The level-compression unit 104 level-compresses the modulation signal. The gradation-correction unit 105 modulates the input image with the level-compressed modulation signal to acquire a gradation-corrected image.

The image-processing device 100 of such a configuration performs the gradation correction in the above-described first to third embodiments (FIG. 1 to FIG. 3).

The invention is not limited to the above embodiments, and various modifications may be made without departing from the spirit and scope of the invention. Any improvement may be made in part or all of the components.

What is claimed is:

1. An image-processing device, comprising:
an image-input unit configured to receive an input image;
a fluctuation-extraction unit coupled to the image-input unit and configured to extract a local-fluctuation component from the input image and to generate a local-fluctuation image containing the local-fluctuation component;
a modulation-signal-generation unit coupled to the image-input unit and the fluctuation-extraction unit, and configured to generate a modulation signal for modulating the input image to the local-fluctuation image;
a level-compression unit coupled to the modulation-signal-generation unit and configured to level-compress the modulation signal; and
a gradation-correction unit coupled to the level-compression unit and configured to modulate the input image with the level-compressed modulation signal, thereby producing a gradation-corrected image;
wherein the input image is a color image comprising a plurality of components, and the gradation-correction unit produces the gradation-corrected image by performing weighted addition of a multiplied image and an offset-corrected image, the gradation-correction unit producing the multiplied image by multiplying the level-compressed modulation signal and the plurality of components, and producing the offset-corrected image by subjecting the plurality of components of the input image to offset correction so as to align with the multiplied image in signal level.

2. The image-processing device according to claim 1, wherein the gradation-correction unit is further configured to change a weighted ratio of the multiplied image and the offset-corrected image in accordance with the modulation signal.

3. An image-processing device, comprising:
an image-input unit configured to receive an input image;
a fluctuation-extraction unit coupled to the image-input unit and configured to extract a local-fluctuation component from the input image and to generate a local-fluctuation image containing the local-fluctuation component;
a modulation-signal-generation unit coupled to the image-input unit and the fluctuation-extraction unit, and configured to generate a modulation signal for modulating the input image to the local-fluctuation image;
a level-compression unit coupled to the modulation-signal-generation unit and configured to level-compress the modulation signal; and
a gradation-correction unit coupled to the level-compression unit and configured to modulate the input image with the level-compressed modulation signal, thereby producing a gradation-corrected image, wherein the gradation-correction unit further comprises an adjustment-input unit configured to accept, from a user, adjustment of a weighted ratio Ws for a shadow area and a weighted ratio Wh for a highlight area of the image; and an effect-adjustment unit configured to generate an output image by performing a weighted addition of the gradation-corrected image and the input image with the weighted ratio Wh in an area in which the modulation signal is no greater than a predetermined threshold value, and by performing a weighted addition of the gradation-corrected image and the input image with the weighted ratio Ws in an area in which the modulation signal has a threshold value exceeding the predetermined threshold value.

4. The image-processing device according to claim 3, wherein the fluctuation-extraction unit is further configured to generate the local-fluctuation image containing the fluctuation component by extracting the local-fluctuation component from a luminance component of the input image.

5. The image-processing device according to claim 4, wherein the luminance component is a V component in an HSV color system.

6. An image-processing program comprising a computer-readable medium bearing program instructions for executing a process that causes a computer to function as the image-input unit, the fluctuation-extraction unit, the modulation-signal-generation unit, the level-compression unit, and the gradation-correction unit according to claim 3.

7. An electronic camera, comprising:
the image-processing device according to claim 3; and
an image-pickup device coupled to the image-processing device and configured to image an object, to generate the input image, and to supply the input image to the image-processing device.

8. An image-processing device, comprising:
an image-input unit configured to receive an input image;
a fluctuation-extraction unit coupled to the image-input unit and configured to extract a local-fluctuation component from the input image and to generate a local-fluctuation image containing the local-fluctuation component;
a modulation-signal-generation unit coupled to the image-input unit and the fluctuation-extraction unit, and configured to generate a modulation signal for modulating the input image to the local-fluctuation image;
a level-compression unit coupled to the modulation-signal-generation unit and configured to level-compress the modulation signal; and
a gradation-correction unit coupled to the level-compression unit and configured to modulate the input image with the level-compressed modulation signal, thereby producing a gradation-corrected image, wherein the modulation-signal-generation unit further comprises a range-adjustment unit configured to adjust a signal range of the local-fluctuation image to a predetermined range; and a signal-calculation unit configured to calculate a modulation signal for modulating the input image to the range-adjusted local-fluctuation image.

9. The image-processing device according to claim 8, wherein:
the fluctuation-extraction unit is further configured to generate a local-fluctuation image of a reduced image, the reduced image being generated by reducing a number of pixels of the input image; and
the range-adjustment unit is further configured to obtain a signal range of the local-fluctuation image of the reduced image, to determine a range-adjustment parameter for adjusting the signal range to the predetermined range, and to adjust the signal range of the local-fluctuation image of the input image using the determined range-adjustment parameter.

10. The image-processing device according to claim 9, further configured to subject the reduced image, for preview display, to a same gradation-correction as provided to the input image.

11. An image-processing method, comprising:
extracting a local-fluctuation component from an input image to generate a local-fluctuation image containing the local-fluctuation component;
generating a modulation signal and using the modulation signal for modulating the input image to the local-fluctuation image;

compressing a level of the modulation signal; and
a gradation-correction step comprising modulating the input image with the level-compressed modulation signal to produce a gradation-corrected image,
wherein the input image is a color image comprising a plurality of components,
the gradation-correction step producing the gradation-corrected image further comprises performing a weighted addition of a multiplied image and an offset-corrected image,
the multiplied image is obtained by multiplying the level-compressed modulation signal and the plurality of components, and
the offset-corrected signal is obtained by offset-correcting the plurality of components of the input image to align the input image in signal level with the multiplied image.

12. The image-processing method according to claim 11, wherein the gradation-correction step further produces a change in a weighted ratio of the multiplied image and the offset-corrected image in accordance with the modulation signal.

13. An image-processing method, comprising:
extracting a local-fluctuation component from an input image to generate a local-fluctuation image containing the local-fluctuation component;
generating a modulation signal and using the modulation signal for modulating the input image to the local-fluctuation image;
compressing a level of the modulation signal; and
a gradation-correction step comprising modulating the input image with the level-compressed modulation signal to produce a gradation-corrected image; accepting, from a user, an adjustment of a weighted ratio Ws for a shadow area and a weighted ratio Wh for a highlight area; and performing a weighted addition of the gradation-corrected image and the input image with the weighted ratio Wh in an area in which the modulation signal is no greater than a predetermined threshold value and performing a weighted addition of the gradation-corrected image and the input image with the weighted ratio Ws in an area in which the modulation signal has a threshold value exceeding the predetermined threshold value, to generate an output image.

14. The image-processing method according to claim 13, wherein the step of extracting a local-fluctuation component generates the local-fluctuation image containing the fluctuation component by extracting the local-fluctuation component from a luminance component of the input image.

15. The image-processing method according to claim 14, wherein the luminance component is a V component in an HSV color system.

16. An image-processing method, comprising:
extracting a local-fluctuation component from an input image to generate a local-fluctuation image containing the local-fluctuation component;
generating a modulation signal and using the modulation signal for modulating the input image to the local-fluctuation image;
compressing a level of the modulation signal; and
a gradation-correction step comprising modulating the input image with the level-compressed modulation signal to produce a gradation-corrected image;
wherein the step of generating a modulation signal further comprises adjusting a signal range of the local-fluctuation image to a predetermined range, and calculating a modulation signal for modulating input image to the range-adjusted local-fluctuation image.

17. The image-processing method according to claim 16, wherein:
the step of extracting a local-fluctuation component generates a local-fluctuation image of the reduced image that is obtained by reducing a number of pixels of the input image; and
the step of adjusting the signal range comprises obtaining a signal range of the local-fluctuation image of the reduced image, determining a range-adjustment parameter for adjusting the signal range to the predetermined range, and adjusting the signal range of the local-fluctuation image of the input image using the determined range-adjustment parameter.

18. The image-processing method according to claim 17, further comprising subjecting the reduced image, for preview display, to a same gradation-correction as applied to the input image.

* * * * *